(12) United States Patent
Ferron

(10) Patent No.: US 11,903,529 B2
(45) Date of Patent: Feb. 20, 2024

(54) VESSEL FOR COOKING FOOD PROVIDED WITH A THERMAL SIGNALING DEVICE

(71) Applicant: ZWILLING BALLARINI ITALIA S.R.L., Rivarolo Mantovano (IT)

(72) Inventor: Francesco Ferron, Casalmaggiore (IT)

(73) Assignee: ZWILLING BALLARINI ITALIA S.R.L., Rivarolo Mantovano (IT)

( * ) Notice: Subject to any disclaimer, the term of this patent is extended or adjusted under 35 U.S.C. 154(b) by 42 days.

(21) Appl. No.: 17/411,503

(22) Filed: Aug. 25, 2021

(65) Prior Publication Data

US 2022/0279981 A1  Sep. 8, 2022

(30) Foreign Application Priority Data

Sep. 1, 2020  (IT) .......................... 202020000005014

(51) Int. Cl.
*A47J 45/06* (2006.01)
*A47J 36/02* (2006.01)
*A47J 45/08* (2006.01)

(52) U.S. Cl.
CPC ............. *A47J 45/068* (2013.01); *A47J 36/02* (2013.01); *A47J 45/061* (2013.01); *A47J 45/08* (2013.01)

(58) Field of Classification Search
CPC ........ A47J 45/068; A47J 36/02; A47J 45/061; A47J 45/08; A47J 45/06; A47J 2202/00; A47J 36/00; G01K 2207/06; Y10S 220/912; B25G 3/00
USPC ....................................................... 220/573.1
See application file for complete search history.

(56) References Cited

U.S. PATENT DOCUMENTS

| 4,794,666 A | * | 1/1989 | Kim | A47J 45/08 |
| | | | | 220/753 |
| 2005/0103209 A1 | * | 5/2005 | Ferron | A47J 45/068 |
| | | | | 99/422 |
| 2005/0133522 A1 | * | 6/2005 | Son | A47J 45/068 |
| | | | | 220/759 |

FOREIGN PATENT DOCUMENTS

| GB | 2429285 A | * | 2/2007 | ............ A47J 45/068 |
| KR | 200350330 Y1 | * | 5/2004 | |
| KR | 20130068095 A | * | 6/2013 | |
| KR | 101460512 B1 | * | 11/2014 | |
| WO | WO-9959455 A1 | * | 11/1999 | ............ A47J 45/068 |
| WO | WO-2015004542 A1 | * | 1/2015 | ............ A47J 45/068 |
| WO | WO-2020109183 A1 | * | 6/2020 | ............ A47J 45/061 |

OTHER PUBLICATIONS

English Machine Translation of KR-200350330-Y1 (Year: 2004).*

* cited by examiner

*Primary Examiner* — John K Fristoe, Jr.
*Assistant Examiner* — Laura E. Parker
(74) *Attorney, Agent, or Firm* — Vorys, Sater, Seymour and Pease LLP

(57) ABSTRACT

A vessel for cooking food is described, including a body which in turn includes a bottom wall and at least one side wall. The side wall extends from the bottom wall to define an inner space of the vessel where food is placed to be cooked. The vessel for cooking food also includes at least one handle, made from a first metal material, preferably steel, and bound to a portion of the body through interposition of at least one connection element made from a second metal material, preferably aluminum. The coefficient of thermal conductivity of the second metal material is greater than the coefficient of thermal conductivity of the first metal material. The connection element is operationally connected to at least one thermal signaling device.

19 Claims, 3 Drawing Sheets

VESSEL FOR COOKING FOOD PROVIDED WITH A THERMAL SIGNALING DEVICE

This claims the benefit of Italian patent application no. 202020000005014, filed Sep. 1, 2020, incorporated by reference.

The present invention relates to a vessel for cooking food. More specifically, the present invention relates to a vessel for cooking food provided with metal handle(s) and with a thermal signaling device.

In manufacturing vessels and tools in general for cooking food, applications are known wherein an aluminum connection element 102 (see FIG. 1) is used for connecting one or more thermally insulating handles 104, typically made from a phenolic resin, to the cooking vessel 100. This phenolic resin is also commercially known with the name of Bakelite.

The aluminum connection element 102 makes it possible, in general, to connect every heat insulating handle 104 to the cooking vessel 100 through a fastening system using one or more rivets 106. The heat insulating handle 104 and the aluminum connection element 102 are in turn connected to each other through one or more screws 108.

In other technical solutions, for example that shown in FIG. 2, the heat insulating handle 104 and the aluminum connection element 102 are simultaneously secured through one or more screws 110 which insert in respective stud bolts 112 properly applied onto the cooking vessel 100.

Conversely, no applications are known whereby the aluminum connection element 102 is used for connecting metal handle(s), for instance one or more handles made from steel, to the cooking vessel 100. On the other hand, there are technical reasons whereby the adoption of such solution is not recommended. These technical reasons are bound to the fact that aluminum does not offer the advantage of offering a thermal break, in that it is an even better heat conductor than steel. Consequently, metal handle(s) are typically used in a single-component solution, that is to say that it/they is/are directly fastened onto the cooking vessel.

In some applications (see FIG. 3), at least one sheet 116, made from a thermally insulating material, is possibly interposed in the fastening between the metal handle 114 and the cooking vessel 100. In this way, heat transfer from the cooking vessel 100 to the metal handle 114, which is usually made from steel, is reduced, thus improving the safety performances in terms of protection from burns.

However, no applications are known whereby cooking vessels provided with metal handle(s), typically made from steel, are provided with thermal signaling devices. As a matter of fact, a thermal signaling device must be thermally connected to the object to be monitored/controlled in order for it to be able to provide information about a thermal status.

If the thermal signaling device were put in contact with a steel handle, or placed internally thereto, it would not be possible to get an appropriate response because of the reduced thermal conductivity of steel. In other words, a thermal signaling device configured in this manner would provide very much delayed responses, consequently not useful for correctly managing the cooking vessel temperature.

An object of the present invention is therefore to implement a vessel for cooking food, in particular a vessel for cooking food provided with metal handle(s) and with a thermal signaling device, that is capable of solving the above-mentioned drawbacks of the prior art in an extremely simple, cost-effective, and particularly functional manner.

In details, an object of the present invention is to implement a vessel for cooking food that, when provided with one or more metal handles, typically made from steel, is capable of providing information on its own thermal status in a quick and accurate manner.

Another object of the present invention is to implement a vessel for cooking food that, when provided with one or more metal handles, typically made from steel, is capable of providing information on its own thermal status in a manner that is absolutely safe for a user.

These objects according to the present invention are achieved by implementing a vessel for cooking food, in particular a vessel for cooking food provided with metal handle(s) and with a thermal signaling device, as disclosed in claim 1.

Further features of the invention are highlighted in the dependent claims, which form an integral part of the present disclosure.

The features and advantages of a vessel for cooking food according to the present invention will be more apparent from the following description and is an explanatory, non-limitative one, which makes reference to the attached schematic drawings, wherein.

Figure 1:
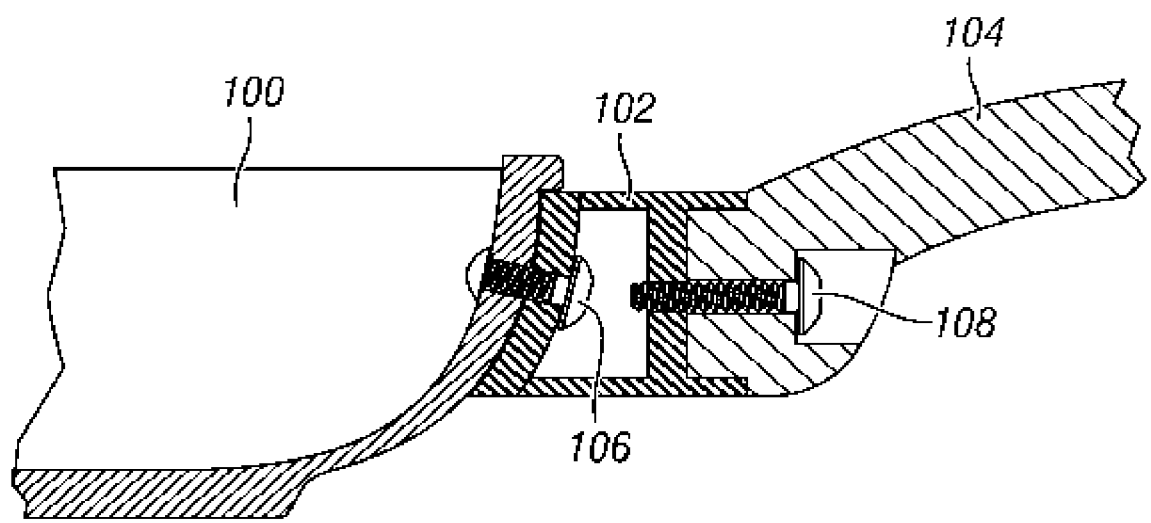
FIG. 1 is a vertical cross-sectional view of a portion of a cooking vessel according to the prior art.
Figure 2:
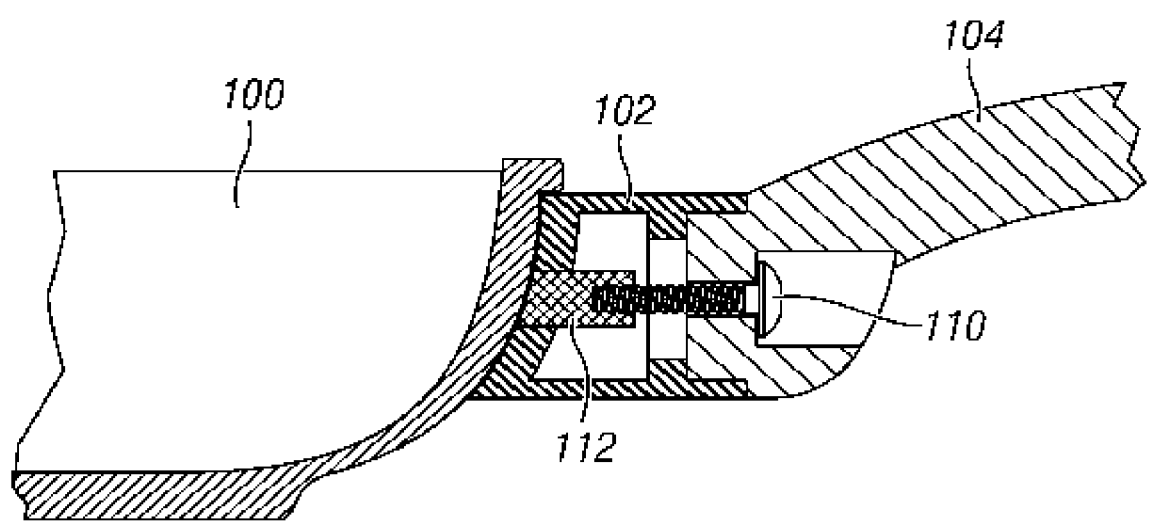
FIG. 2 is a vertical cross-sectional view of a portion of another cooking vessel according to the prior art.
Figure 3:
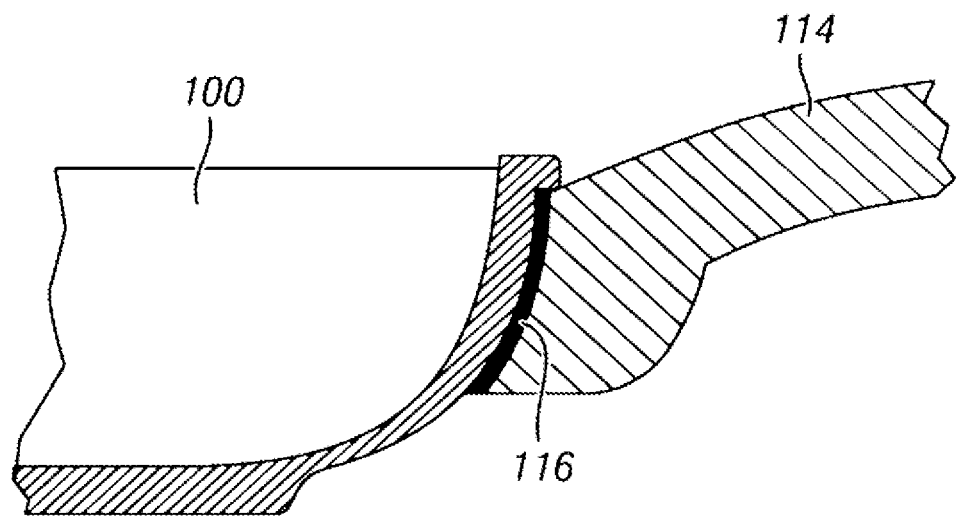
FIG. 3 is a vertical cross-sectional view of a portion of a further cooking vessel according to the prior art.
Figure 4:
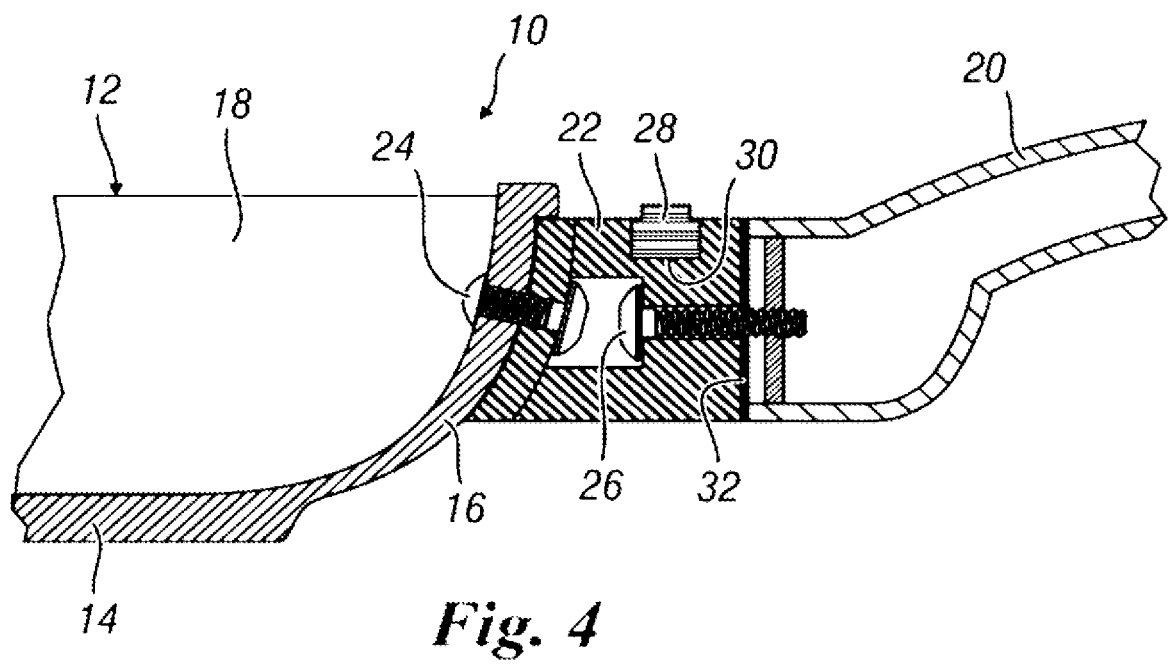
FIG. 4 is a vertical cross-sectional view of a portion of a cooking vessel according to the present invention.
Figure 5:
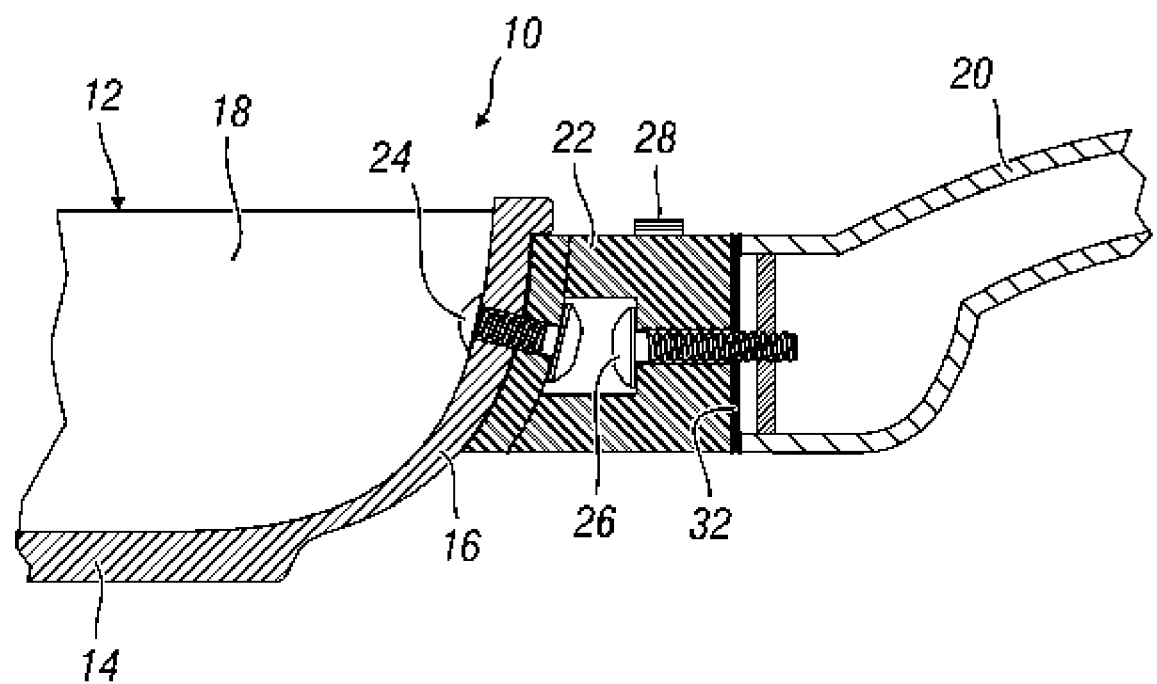
FIG. 5 is a further vertical cross-sectional view of a portion of a cooking vessel according to the present invention.

With a specific reference to FIG. 4, a preferred explanatory embodiment of a vessel for cooking food is shown according to the present invention, identified as a whole by the numeral reference 10. The cooking vessel 10 comprises a body 12 which in turn comprises a bottom wall 14 and at least one side wall 16 which extends from such bottom wall 14.

In a preferred explanatory embodiment of the present invention, the cooking vessel 10 is a conventional pan provided with a substantially circular bottom wall 14. The pan comprises one side wall 16 only which extends from the bottom wall 14 and, more specifically, from the circular edge of the bottom wall 14. It is in any case possible to have a cooking vessel 10 provided with a plurality of side walls 16, for example a cooking vessel 10 whose bottom wall 14 has a quadrilateral shape. Irrespective of the shape of the cooking vessel 10, its side wall 16 extends from the bottom wall 14 in a conventional and a by itself-known manner, so as to define an inner space 18 of the cooking vessel 10 wherein food is arranged in order for it to be cooked.

The cooking vessel 10 also comprises at least one handle 20 made from a first metal material, preferably steel. The handle 20 is bound to a portion of the body 12, typically consisting of a side wall 16, through the interposition of at least one connection element 22 made from a second metal material, preferably aluminum. In any case, the coefficient of thermal conductivity of second metal material, which the connection element 22 is made from, is greater than the coefficient of the thermal conductivity of the first metal material, which the handle 20 is made from.

The connection element 22 can be connected to the cooking vessel 10 in a per se known manner, through a fastening system using one or more rivets 24. The handle 20 can be connected to the connection element 22 through one or more screws 26 in a per se known manner.

The connection element 22 is operationally connected to at least one thermal signaling device 28. For example, the thermal signaling device 28, which might be of any types known in the state of the art, might be at least partially inserted in a corresponding cavity 30 obtained in the connection element 22, as shown in FIG. 4. Alternatively, the thermal signaling device 28 might be simply placed on an outer surface of the connection element 22.

By taking advantage of the thermal conductivity property of aluminum, which the connection element 22 is preferably made from, and using such connection element 22 for connecting the cooking vessel 10 to the handle 20, which is preferably made from steel, it is thus possible to operate the thermal signaling device 28. In this way, information on the thermal status of the cooking vessel 10 is provided in a quick and effective manner.

In order to improve safety on the thermal status of the handle 20 made from steel, at least one insulating gasket 32 might be interposed between the connection element 22, which is made from aluminum, and the handle 20, which is made from steel. This insulating gasket 32 might be made from any insulating materials suitable for this purpose.

As previously mentioned, the thermal signaling device 28 might be implemented according to methods that are known in the state of the art. For example, the thermal signaling device 28 might consist of one or more thermo-chromatic elements. Alternatively, the thermal signaling device 28 might consist of one or more foil or spring thermal actuators, just to mention the most known ones.

It has been thus seen that the vessel for cooking food according to the present invention achieves the previously highlighted objects.

The thus conceived vessel for cooking food is in any case susceptible of numerous modifications and variants, all of them falling within one and the same innovative concept; also, all details are replaceable by technically equivalent elements. In practice, the materials used, as well as shapes and dimensions, might be whatsoever depending on the actual technical requirements.

Therefore, the scope of protection of this invention is that defined by the attached claims.

The invention claimed is:

1. A vessel for cooking food comprising:
  a body, in turn comprising a bottom wall and at least one side wall, wherein said side wall extends from said bottom wall to define an inner space of the cooking vessel where food is arranged in order for it to be cooked; and
  at least one handle, made from a steel and bound to and a portion of said body through the interposition of a connection element fixed to the handle and made from a second metal material,
  wherein the coefficient of thermal conductivity of the second metal material, which said connection element is made from, is greater than the coefficient of thermal conductivity of the steel, which said handle is made from,
  wherein said connection element is operationally connected to at least one thermal signaling device,
  wherein said connection element abuts the at least one side wall of the body,
  wherein the connection element has sidewalls, and opposed first and second end walls made of the second metal material, the connection element sidewalls attached to the connection element first end wall, the connection element sidewalls integral with the connection element second end wall,
  wherein the connection element second metal material defines a vertical first cavity consisting of a vertical first cavity top opening at a top surface of the connection element sidewalls, vertical first cavity closed side walls, and a vertical first cavity bottom wall defining a closed end within the connection element,
  wherein the vertical first cavity extends from the vertical first cavity top opening to the vertical first cavity bottom wall defining a closed end;
  wherein the at least one thermal signaling device abuts said connection element by having the at least one thermal signaling device at least partially inserted in the connection element vertical first cavity through said connection element top surface to expose an upper surface of said thermal signaling device and have the at least one thermal signaling device extend downwardly to the vertical first cavity bottom wall defining the closed end of the connection element to have sidewalls of the connection element surrounded by and abutting the connection element second metal material,
  wherein the at least one thermal signaling device is adapted and configured to operate based on the thermal conductivity of the connection element, and
  wherein at least one insulating gasket is interposed between said connection element and said handle to prevent contact of said connection element and said handle,
  wherein inner surfaces of the connection element sidewalls, first end wall and second end wall define a horizontal second cavity separate from the vertical first cavity,
  wherein the connection element first end wall defines an opening and the connection element second end wall defines an opening,
  wherein the connection element first end wall abuts the at least one side wall of the body and the connection element second end wall abuts the at least one insulating gasket.

2. The cooking vessel according to claim 1,
  wherein said connection element first end wall is curved and abuts the body,
  wherein said connection element and said handle are connected by a screw having a screw head that is in the horizontal second cavity, and a threaded screw shaft that extends from the screw head through the connection element second end wall into the handle,
  wherein said connection element and said side wall of the body are connected by a rivet having a rivet head and a rivet shaft, wherein the rivet head is in the horizontal second cavity in a location opposed to the screw head, and the rivet shaft extends from the rivet head through the connection element curved first end wall that abuts the body.

3. The cooking vessel according to claim 2, wherein said connection element is made from aluminum.

4. The cooking vessel according to claim 1, wherein said connection element is made from aluminum.

5. The cooking vessel according to claim 1, wherein said thermal signaling device consists of one or more thermo-chromatic elements.

6. The cooking vessel according to claim 1, wherein said thermal signaling device consists of one or more foil or spring thermal actuators.

7. The cooking vessel according to claim 1, wherein said connection element is connected to the cooking vessel through a fastening system using one or more rivets.

8. The cooking vessel according to claim 7, wherein said connection element is made from aluminum.

9. The cooking vessel according to claim 1, wherein said handle is connected to said connection element through one or more screws.

10. The cooking vessel according to claim 9, wherein said connection element is made from aluminum.

11. The cooking vessel according to claim 1,
wherein said connection element and said handle are connected by a screw-having a screw head and a screw threaded shaft,
wherein the screw head is in the second horizontal cavity in the connection element, and the screw threaded shaft extends from the screw head through the connection element into the handle,
wherein said connection element and said side wall of the body are connected by a rivet having a rivet head and a rivet shaft,
wherein the rivet head is in the second horizontal cavity in a location opposed to the screw head and the rivet shaft extends through the connection element into the body.

12. A vessel for cooking food comprising:
a body, in turn comprising a bottom wall and at least one side wall, wherein said side wall extends from said bottom wall to define an inner space of the cooking vessel where food is arranged in order for it to be cooked; and
at least one handle, made from a steel and bound to and a portion of said body through the interposition of a connection element fixed to the handle and made from a second metal material,
wherein the coefficient of thermal conductivity of the second metal material, which said connection element is made from, is greater than the coefficient of thermal conductivity of the steel, which said handle is made from,
wherein said connection element is operationally connected to at least one thermal signaling device,
wherein said connection element abuts the at least one side wall of the body,
wherein the connection element has sidewalls, and opposed first and second end walls made of the second metal material, the connection element sidewalls attached to the connection element first end wall, the connection element sidewalls integral with the connection element second end wall,
wherein the at least one thermal signaling device abuts said connection element,
wherein said thermal signaling device is entirely positioned outside said connection element on an outer surface of said connection element,
wherein the at least one thermal signaling device is adapted and configured to operate based on the thermal conductivity of the connection element, and
wherein at least one insulating gasket is interposed between said connection element and said handle to prevent contact of said connection element and said handle,
wherein inner surfaces of the connection element sidewalls, first end wall and second end wall define a horizontal cavity within the connection element, wherein the connection element first end wall defines an opening and the connection element second end wall defines an opening,
wherein the connection element first end wall abuts the at least one side wall of the body and the connection element second end wall abuts the at least one insulating gasket.

13. The cooking vessel according to claim 12, wherein said connection element is made from aluminum.

14. The cooking vessel according to claim 12, wherein said connection element first end wall is curved and abuts the body;
wherein said connection element and said handle are connected by a screw having a screw head that is in the horizontal cavity, and a threaded screw shaft that extends from the screw head through the connection element second end wall into the handle,
wherein said connection element and said side wall of the body are connected by a rivet having a rivet head and a rivet shaft, wherein the rivet head is in the horizontal cavity in a location opposed to the screw head, and the rivet shaft extends from the rivet head through the connection element curved first end wall that abuts the body.

15. The cooking vessel according to claim 14, wherein said connection element is made from aluminum.

16. The cooking vessel according to claim 12, wherein said thermal signaling device consists of one or more thermo-chromatic elements.

17. The cooking vessel according to claim 12, wherein said thermal signaling device consists of one or more foil or spring thermal actuators.

18. The cooking vessel according to claim 12, wherein said connection element is connected to the cooking vessel through a fastening system using one or more rivets.

19. The cooking vessel according to claim 12, wherein said handle is connected to said connection element through one or more screws.

* * * * *